US010613406B2

(12) United States Patent
Lee et al.

(10) Patent No.: US 10,613,406 B2
(45) Date of Patent: Apr. 7, 2020

(54) ELECTRONIC VENETIAN BLIND

(71) Applicant: SWIS CO, LTD., Chungcheongnam-Do (KR)

(72) Inventors: Nam Ju Lee, Gyeonggi-Do (KR); Hyun Ki Bin, Chungcheongnam-Do (KR)

(73) Assignee: SWIS CO., LTD., Chungcheongnam-Do (KR)

(*) Notice: Subject to any disclaimer, the term of this patent is extended or adjusted under 35 U.S.C. 154(b) by 32 days.

(21) Appl. No.: 15/771,824

(22) PCT Filed: Apr. 22, 2016

(86) PCT No.: PCT/KR2016/004265
§ 371 (c)(1),
(2) Date: Apr. 27, 2018

(87) PCT Pub. No.: WO2017/073864
PCT Pub. Date: May 4, 2017

(65) Prior Publication Data
US 2018/0321564 A1 Nov. 8, 2018

(30) Foreign Application Priority Data
Oct. 29, 2015 (KR) .................. 10-2015-0150607

(51) Int. Cl.
G02F 1/153 (2006.01)
E06B 9/28 (2006.01)
(Continued)

(52) U.S. Cl.
CPC ............. G02F 1/153 (2013.01); E06B 9/24 (2013.01); E06B 9/264 (2013.01); E06B 9/28 (2013.01);
(Continued)

(58) Field of Classification Search
None
See application file for complete search history.

(56) References Cited

U.S. PATENT DOCUMENTS

2013/0271812 A1* 10/2013 Brown .................. E06B 9/24
359/275
2016/0363799 A1* 12/2016 West .................. G02F 1/13306

FOREIGN PATENT DOCUMENTS

JP 2002-131730 A 5/2002
KR 10-2012-009247 A 8/2012
(Continued)

OTHER PUBLICATIONS

International Search Report from corresponding PCT Application No. PCT/KR2016/004265, dated Aug. 17, 2016, and it's English translation.

Primary Examiner — William R Alexander
Assistant Examiner — Gary W O'Neill
(74) Attorney, Agent, or Firm — Harness, Dickey & Pierce, P.L.C.

(57) ABSTRACT

The present disclosure relates to an electronic venetian blind, the electronic venetian blind, as a first invention, including: a first transparent conductive film layer; a plurality of unit electrochromic layers stacked on the first transparent conductive film layer, arranged separated from each other; and a plurality of second transparent conductive film layers each stacked on the plurality of unit electrochromic layers and independently applying current thereto.

7 Claims, 4 Drawing Sheets

(51) Int. Cl.
    *E06B 9/24*           (2006.01)
    *E06B 9/264*         (2006.01)
    *E06B 9/386*         (2006.01)
    *G02F 1/15*          (2019.01)
    *G02F 1/1334*       (2006.01)

(52) U.S. Cl.
    CPC ....... *E06B 9/386* (2013.01); *E06B 2009/2405* (2013.01); *E06B 2009/2464* (2013.01); *E06B 2009/2643* (2013.01); *G02F 1/1334* (2013.01); *G02F 1/15* (2013.01)

(56) References Cited

FOREIGN PATENT DOCUMENTS

| | | | | |
|---|---|---|---|---|
| KR | 10-2015-0035460 A | 4/2015 | | |
| KR | 20150035460 A | * 4/2015 | ............... | E06B 9/24 |
| KR | 10-1520396 B1 | 5/2015 | | |
| WO | WO-2010/100807 A1 | 9/2010 | | |

\* cited by examiner

ELECTRONIC VENETIAN BLIND

CROSS-REFERENCE TO RELATED APPLICATIONS

This application is a national phase application of PCT Application No. PCT/KR2016/004265, filed on 22 Apr. 2016, which claims benefit of Korean Patent Application 10-2015-0150607, filed on 29 Oct. 2015. The entire disclosure of the applications identified in this paragraph are incorporated herein by reference.

TECHNICAL FIELD

The present disclosure relates to an electronic venetian blind, and more particularly, to an electronic venetian blind in which a venetian blind formed by weaving a flat crossbar is electrically implemented.

BACKGROUND ART

This section provides background information related to the present disclosure which is not necessarily the prior art.

A blind refers to a device that may block a light beam input through a transparent window or may protect privacy.

The widely used blind is directly controlled by a hand of a user.

Meanwhile, a polymer dispersed liquid crystal (PDLC) element includes a PDLC membrane and transparent conductive membranes arranged on opposite surfaces of the PDLC membrane.

The PDLC membrane is formed by dispersing a liquid crystal on a polymer matrix in the form of a microdroplet, and such a PDLC was researched by Press and Arrot in 1974.

Through the transparent conductive membranes, the PDLC membrane becomes transparent in an electric ON state, and becomes opaque in an electric OFF state.

In detail, in the electric ON state, the liquid crystal is arranged in a vertical direction of the transparent conductive membranes. As a result, a light beam passes through the liquid crystal so that the PDLC membrane becomes transparent.

In contrast, in the electric OFF state, the liquid crystal is maintained to be arranged irregularly. As a result, the light beam is diffusely reflected by the liquid crystal so that the PDLC membrane becomes opaque.

An electronic blind refers to a device in which as a PDLC element is arranged between two sheets of glass, a function which is the same as that of a blind is electrically implemented using such a technology. The electronic blind is referred to as a smart glass or an intelligent glass as another name.

In this regard, a technology in which one of the transparent conductive membranes arranged on the opposite surfaces of the PDLC membrane is etched and is divided into a plurality of electrically insulated division areas and the division areas are independently controlled, so that the smart glass becomes partially transparent or become partially opaque was disclosed in Korean Patent No. 10-1520396. In particular, a technology was disclosed in which an interval between the division areas is minimized using a laser beam and operations of the division areas are controlled using an infrared touch sensor.

DISCLOSURE

Technical Problem

The present disclosure provides an electronic venetian blind in which gaps between division areas are maintained transparently regardless of whether electricity flows, so that a venetian blind formed by weaving a flat crossbar may be implemented.

The present disclosure also provides an electronic venetian blind in which the width of the division areas is adjusted so that a form in which the flat crossbar rotates may be implemented in a venetian blind.

Technical Solution

This section provides a general summary of the disclosure and is not a comprehensive disclosure of its full scope or all of its features.

To solve the above problems, the present disclosure provides, as a first invention, an electronic venetian blind including a first transparent conductive film layer, a plurality of unit electrochromic layers stacked on the first transparent conductive film layer and separated from each other, and a plurality of second transparent conductive film layers stacked on the plurality of unit electrochromic layers, respectively, and configured to independently apply a current to the plurality of unit electrochromic layers.

The present disclosure provides, as a second invention, in the electronic venetian blind of the first invention, an electronic venetian blind in which a gap between the plurality of unit electrochromic layers is provided as an empty space.

The present disclosure provides, as a third invention, in the electronic venetian blind of the first invention, an electronic venetian blind in which the plurality of unit electrochromic layers is PDLCs or suspended particle devices (SPDs).

The present disclosure provides, as a fourth invention, in the electronic venetian blind of the first invention, an electronic venetian blind in which at least one of the plurality of second transparent conductive film layers includes a plurality of second transparent conductive sub-film layers electrically insulated from each other, at least two second transparent conductive sub-film layers being provided in one of the plurality of unit electrochromic layers.

The present disclosure provides, as a fifth invention, in the electronic venetian blind of the first invention, an electronic venetian blind further including a first glass arranged on a surface among opposite surfaces of the first transparent conductive film layer, which is opposite to the plurality of unit electrochromic layers, and a second glass arranged on a surface among opposite surfaces of the plurality of second transparent conductive film layers, which is opposite to the plurality of unit electrochromic layers.

The present disclosure provides, as a sixth invention, in the electronic venetian blind of the fifth invention, an electronic venetian blind further including a first joining film interposed between the first glass and the first transparent conductive film layer, and a second joining film interposed between the second glass and the plurality of second transparent conductive film layers.

The present disclosure provides, as a seventh invention, in the electronic venetian blind of the first invention, an electronic venetian blind further including a power source configured to apply a current to the first transparent conductive film layer and the plurality of second transparent conductive film layers, and a controller configured to independently control electrical connection between the power source and the plurality of second transparent conductive film layers, based on a set control signal.

The present disclosure provides, as an eighth invention, in the electronic venetian blind of the seventh invention, an electronic venetian blind further including a control signal generating unit including a light emitting unit configured to transmit an optical signal and a light receiving unit configured to receive the optical signal, which correspond to the plurality of second transparent conductive film layers, and configured to, when the optical signal is interrupted, generate the set control signal to transmit the control signal to the controller.

The present disclosure provides, as a ninth invention, in the electronic venetian blind of the seventh invention, an electronic venetian blind further including a control signal generating unit configured to generate the set control signal based on collection or a duration time of a signal wiredly or wirelessly input from the outside, to transmit the control signal to the controller.

The present disclosure provides, as a tenth invention, in the electronic venetian blind of the fourth invention, an electronic venetian blind in which the plurality of second transparent conductive sub-film layers are provided such that whether a current is applied is independently controlled in a state in which the current is not applied to the plurality of second transparent conductive film layers.

Advantageous Effects

According to the present disclosure, since gaps between division areas are maintained transparently regardless of whether electricity flows, a form of a venetian blind is implemented, so that user's satisfaction may be improved.

According to the present disclosure, the width of the division areas is adjusted, and thus a form in which the flat crossbar rotates is implemented in a venetian blind, so that user's satisfaction may be improved.

According to the present disclosure, a conventional problem may be resolved in which since the gaps between the division areas are always maintained opaque, beauty of an outer appearance deteriorates, and man hours and manufacturing costs consumed for reducing the gaps between the division areas to minimize a damage to the outer appearance may be reduced.

BEST MODE

Hereinafter, various embodiments of an electronic venetian blind according to the present disclosure will be described with reference to the accompanying drawings.

However, the spirit of the present disclosure is not limited by the following embodiments. Further, those skilled in the art who understands the spirit of the present disclosure may easily propose various embodiments included in the same scope of the technical spirit as the present disclosure through substitution or change, and these embodiments are included in the technical spirit of the present disclosure.

Also, since terms used herein are selected for convenience of description, in understanding the technical contents of the present disclosure, the terms should be approximately interpreted as meanings according with the technical spirit of the present disclosure without being limited to dictionary meanings.

Figure 1:
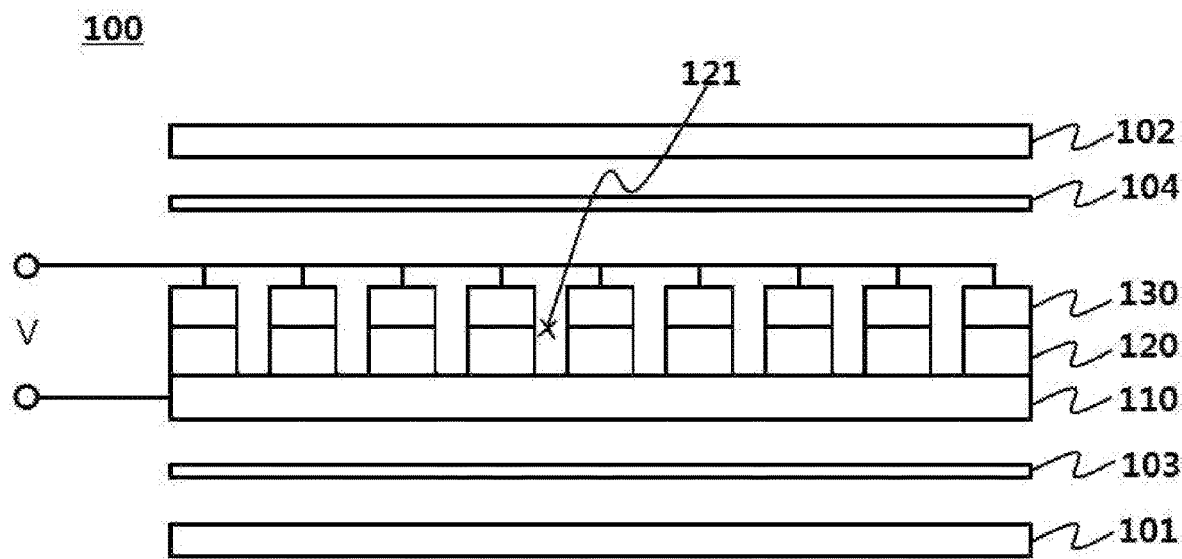
FIG. 1 is a view illustrating a first embodiment of an electronic venetian blind according to the present disclosure.

FIG. 1 is a view illustrating a first embodiment of an electronic venetian blind according to the present disclosure.

Referring to FIG. 1, an electronic venetian blind 100 according to the present embodiment includes a first transparent conductive film layer 110, a plurality of unit electrochromic layers 120, and a plurality of second transparent conductive film layers 130.

The first transparent conductive film layer 110 and the plurality of second transparent conductive film layers 130 may be formed of indium tin oxide (ITO) or Zinc oxide (ZnO).

Here, the first transparent conductive film layer 110 and the plurality of second transparent conductive film layer 130 formed of ZnO may be doped with a material selected from the group consisting of aluminum (Al), gallium (Ga), indium (In), and boron (B).

Unlike this, the first transparent conductive film layer 110 and the plurality of second transparent conductive film layers 130 may have, as a base film, any one of a polyethylene terephthalate (PET) film, a cyclic olefin polymer (COP) film, a cyclic olefin copolymer (COC) film, a polyethylene naphthalate (PEN) film, and a polyether sulfone (PES) film, in which the base film is coated with ITO or ZnO.

The plurality of unit electrochromic layers 120 is stacked on the first transparent conductive film layer 110, and are arranged to be separated from each other. That is, the plurality of unit electrochromic layers 120 has gaps 121 provided as empty spaces and maintained transparently regardless of whether electric power is applied.

The plurality of second transparent conductive film layers 130 is stacked on the plurality of unit electrochromic layers 120, respectively, and is provided to independently apply a current to the plurality of unit electrochromic layers 120. That is, the plurality of second transparent conductive film layers 130 is arranged to be separated from each other, which is like the plurality of unit electrochromic layers 120.

The plurality of unit electrochromic layers 120 may be PDLCs or suspended particle devices (SPDs).

Meanwhile, the electronic venetian blind 100 according to the present embodiment includes first and second glasses 101 and 102.

The first glass 101 is arranged on a surface among opposite surfaces of the first transparent conductive film layer 110, which is opposite to the plurality of unit electrochromic layers 120, and the second glass 102 is arranged on a surface among opposite surfaces of the plurality of second transparent conductive film layers 130, which is opposite to the plurality of unit electrochromic layers 120.

Accordingly, gaps between the plurality of unit electrochromic layers 120 are always maintained transparent.

Here, the first and second glasses 101 and 102 may be formed of soda lime glass, low iron glass, alkali-free glass, or tempered glass, and may be surface-coated to improve functionality.

Also, the first and second glasses 101 and 102 may be formed of polymethyl methacrylate (PMMA) or polycarbonate, or may be formed of a material obtained by laminating PMMA and polycarbonate.

Meanwhile, in the present embodiment, first and second joining films 103 and 104 may be interposed between the first glass 101 and the first transparent conductive film layer 110 and between the second glass 102 and the plurality of second transparent conductive film layers 130 to join the first glass 101 and the first transparent conductive film layer 110 and to join the second glass 102 and the plurality of second transparent conductive film layers 130.

In the electronic venetian blind 100 according to the present embodiment, as a current is independently applied to the plurality of second transparent conductive film layers 130, whether the plurality of unit electrochromic layers 120 arranged between the plurality of second transparent conductive film 130 layers and the first transparent conductive film layer 110 become transparent or opaque is independently controlled.

Figure 2:
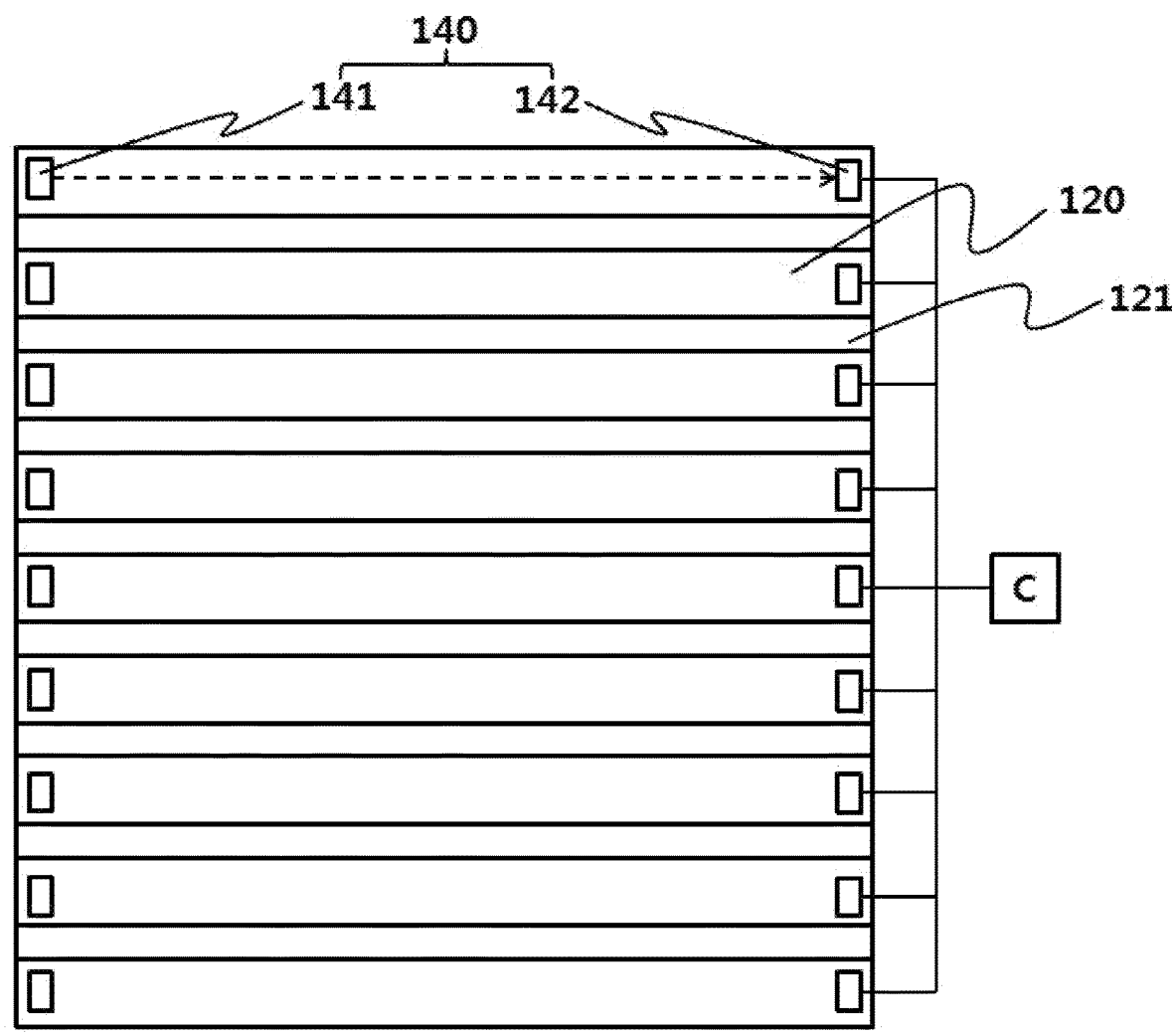
FIG. 2 is a view illustrating a second embodiment of the electronic venetian blind according to the present disclosure.

FIG. 2 is a view illustrating a second embodiment of the electronic venetian blind according to the present disclosure.

In the electronic venetian blind 100 according to the present embodiment, all configurations except for a controller C are the same as those according to the first embodiment. Thus, hereinafter, a feature of the controller C will be described and description of the other configurations will be substituted for the description of the first embodiment.

The electronic venetian blind 100 according to the present embodiment has a power source V configured to apply a current to the first transparent conductive film layer 110 and the plurality of second transparent conductive film layers 130, and the controller C independently controls electrical connection between the power source V and the plurality of second transparent conductive film layers 130 based on a set control signal.

Here, a control signal generating unit 140 is provided to generate the set control signal.

The control signal generating unit 140 includes a light emitting unit 141 configured to transmit an optical signal and a light receiving unit 142 configured to receive the optical signal, which correspond to the plurality of second transparent conductive film layers 130, and when the optical signal is interrupted, generates the set control signal to transmit the set control signal to the controller C.

Accordingly, a user may move his/her hand in a space between the light emitting unit 141 and the light receiving unit 142 to generate the set control signal.

Thus, the plurality of unit electrochromic layers 120 may be sequentially operated.

Figure 3:
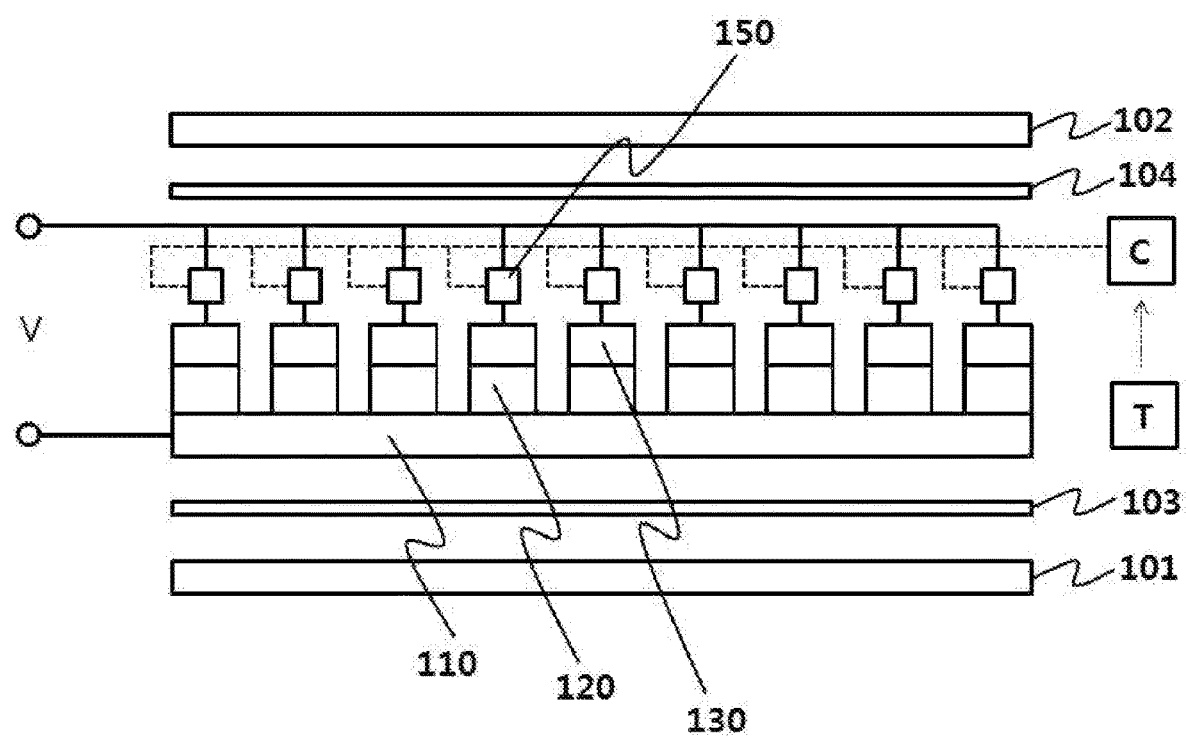
FIG. 3 is a view illustrating a third embodiment of the electronic venetian blind according to the present disclosure.

FIG. 3 is a view illustrating a third embodiment of the electronic venetian blind according to the present disclosure.

The electronic venetian blind 100 according to the present embodiment differs from those according to the second embodiment in that the electronic venetian blind 100 according to the present embodiment has a control signal generating unit 140 configured to generate a control signal set based on collection or a duration time of a signal wiredly or wirelessly input from the outside T, to transmit the control signal to the controller C.

Meanwhile, the controller C controls switching means 150 configured to switch supply of electric power to the plurality of second transparent conductive film layers 130 such that the plurality of unit electrochromic layers 120 independently becomes transparent or opaque.

The other configurations are substituted for the description of those according to the first embodiment.

Figure 4:
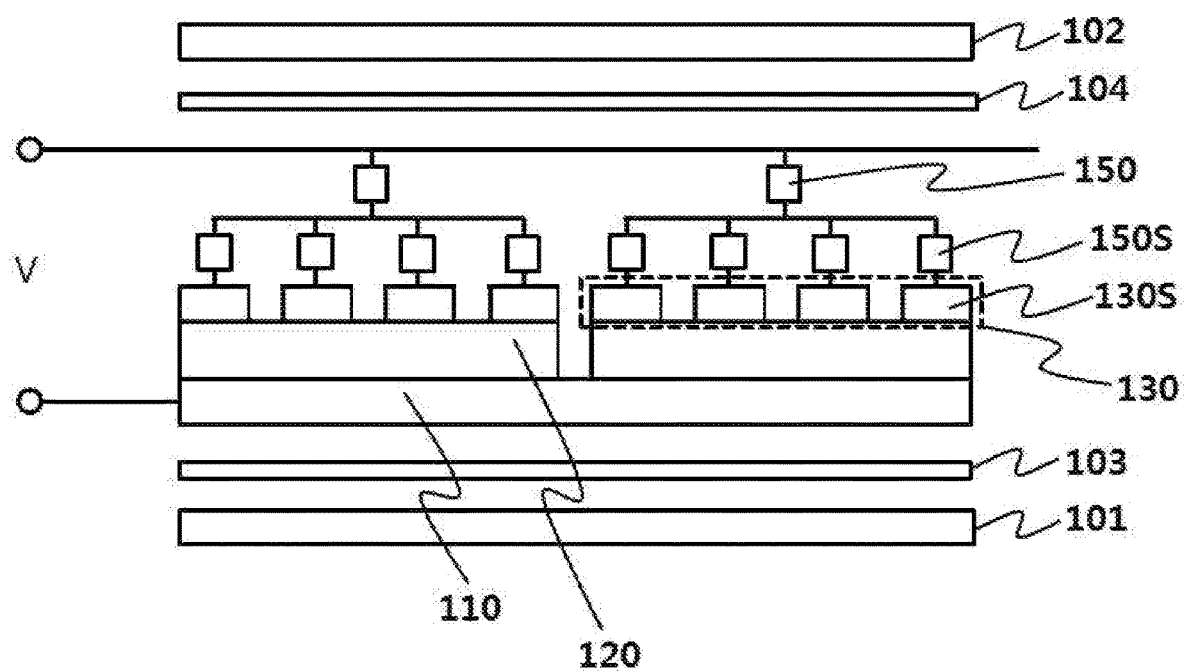
FIG. 4 is a view illustrating a fourth embodiment of the electronic venetian blind according to the present disclosure.

FIG. 4 is a view illustrating a fourth embodiment of the electronic venetian blind according to the present disclosure.

The electronic venetian blind 100 according to the present embodiment may include all the configurations according to the first to third embodiments, and may further include a plurality of second transparent conductive sub-film layers 130S.

The plurality of second transparent conductive sub-film layers 130S is provided in at least one of the plurality of second transparent conductive film layers 130, at least two second transparent conductive sub-film layers 130S are provided in one of the plurality of unit electrochromic layers 120, and the second transparent conductive sub-film layers 130S are electrically insulated from each other.

Here, the plurality of second transparent conductive sub-film layers 130S may be formed by dividing one of the plurality of unit electrochromic layers 120 using an infrared (IR) laser beam at intervals.

Meanwhile, in the present embodiment, the plurality of second transparent conductive sub-film layers 130S is provided such that whether a current is applied is independently controlled in a state in which the current is not applied to the plurality of second transparent conductive film layer 130.

Here, an operation control of the plurality of second transparent conductive sub-film layers 130S may be implemented in the same manner as those according to the second and third embodiments, which have been described above.

In detail, the controller C controls the switching means 150 configured to switch the supply of electric power to the plurality of second transparent conductive film layers 130 such that the plurality of unit electrochromic layers 120 independently becomes transparent or opaque, and, in a state in which the switching means 150 are opened, controls a sub-switching means 150S such that the vertical width of an opaque area formed by the plurality of second transparent conductive film layers 130 may be adjusted.

What is claimed is:

1. An electronic venetian blind comprising:
   a first transparent conductive film layer;
   a plurality of unit electrochromic layers stacked on the first transparent conductive film layer and separated from each other;
   a plurality of second transparent conductive film layers stacked on the plurality of unit electrochromic layers, respectively, and configured to independently apply a current to the plurality of unit electrochromic layers;
   a first glass arranged on a surface among opposite surfaces of the first transparent conductive film layer, which is opposite to the plurality of unit electrochromic layers;
   a second glass arranged on a surface among opposite surfaces of the plurality of second transparent conductive film layers, which is opposite to the plurality of unit electrochromic layers;
   a first joining film interposed between the first glass and the first transparent conductive film layer; and
   a second joining film interposed between the second glass and the plurality of second transparent conductive film layers,
   wherein a gap between the plurality of unit electrochromic layers is provided as an empty space and gaps between division areas are maintained transparently regardless of whether electricity flows.

2. The electronic venetian blind of claim 1, wherein the plurality of unit electrochromic layers is polymer dispersed liquid crystals (PDLCs) or suspended particle devices (SPDs).

3. The electronic venetian blind of claim 1, wherein at least one of the plurality of second transparent conductive film layers includes a plurality of second transparent conductive sub-film layers electrically insulated from each other such that at least two second transparent conductive sub-film layers are provided in one of the plurality of unit electrochromic layers.

4. The electronic venetian blind of claim 3, wherein the plurality of second transparent conductive sub-film layers is provided such that whether a current is applied is independently controlled in a state in which the current is not applied to the plurality of second transparent conductive film layers.

5. The electronic venetian blind of claim 1, further comprising:
   a power source configured to apply a current to the first transparent conductive film layer and the plurality of second transparent conductive film layers; and
   a controller configured to independently control electrical connection between the power source and the plurality of second transparent conductive film layers, based on a set control signal.

6. The electronic venetian blind of claim 5, further comprising:
   a control signal generating unit including a light emitting unit configured to transmit an optical signal and a light receiving unit configured to receive the optical signal, which correspond to the plurality of second transparent conductive film layers, and configured to, when the optical signal is interrupted, generate the set control signal to transmit the control signal to the controller.

7. The electronic venetian blind of claim 5, further comprising:
   a control signal generating unit configured to generate the set control signal based on collection or a duration time of a signal wiredly or wirelessly input from the outside, to transmit the control signal to the controller.

* * * * *